US010079842B1

(12) United States Patent
Brandwine et al.

(10) Patent No.: US 10,079,842 B1
(45) Date of Patent: Sep. 18, 2018

(54) TRANSPARENT VOLUME BASED INTRUSION DETECTION

(71) Applicant: Amazon Technologies, Inc., Seattle, WA (US)

(72) Inventors: Eric Jason Brandwine, Haymarket, VA (US); Robert Eric Fitzgerald, Herndon, VA (US); Alexander Robin Gordon Lucas, Cheltenham (GB)

(73) Assignee: Amazon Technologies, Inc., Seattle, WA (US)

( * ) Notice: Subject to any disclaimer, the term of this patent is extended or adjusted under 35 U.S.C. 154(b) by 183 days.

(21) Appl. No.: 15/085,708

(22) Filed: Mar. 30, 2016

(51) Int. Cl.
*H04L 29/06* (2006.01)

(52) U.S. Cl.
CPC ...... *H04L 63/1416* (2013.01); *H04L 63/1425* (2013.01); *H04L 63/1441* (2013.01)

(58) Field of Classification Search
CPC ............. H04L 63/1416; H04L 63/1425; H04L 63/1441
USPC .......................................................... 726/23
See application file for complete search history.

(56) References Cited

U.S. PATENT DOCUMENTS

| 7,257,689 | B1* | 8/2007 | Baird | G06F 11/1471 707/999.201 |
| 7,616,579 | B2 | 11/2009 | Slattery et al. | |
| 7,840,670 | B2 | 11/2010 | Hedayat et al. | |
| 8,238,834 | B1 | 8/2012 | Bharghavan et al. | |
| 8,549,641 | B2 | 10/2013 | Jakobsson | |
| 8,931,107 | B1 | 1/2015 | Brandwine | |
| 9,032,531 | B1 | 5/2015 | Scorvo et al. | |
| 9,189,627 | B1 | 11/2015 | Islam | |
| 9,462,013 | B1 | 10/2016 | Boss et al. | |
| 9,501,345 | B1* | 11/2016 | Lietz | G06F 11/301 |
| 9,521,053 | B1 | 12/2016 | Chen et al. | |
| 9,565,204 | B2 | 2/2017 | Chesla | |
| 9,609,399 | B2 | 3/2017 | Krishnamurthy et al. | |
| 2001/0013105 | A1 | 8/2001 | Kang et al. | |
| 2003/0084321 | A1* | 5/2003 | Tarquini | H04L 63/1458 726/23 |
| 2003/0188189 | A1* | 10/2003 | Desai | H04L 63/104 726/23 |
| 2003/0204619 | A1 | 10/2003 | Bays | |
| 2004/0049693 | A1* | 3/2004 | Douglas | G06F 21/552 726/23 |
| 2004/0064713 | A1 | 4/2004 | Yadav | |

(Continued)

OTHER PUBLICATIONS

U.S. Appl. No. 15/085,257, filed Mar. 30, 2016.

(Continued)

*Primary Examiner* — Michael S McNally
(74) *Attorney, Agent, or Firm* — Davis Wright Tremaine LLP

(57) ABSTRACT

A computing resource service provider may provide customers with a block-level forensics service. Logical volumes associated a customer may be used to instantiate computing resources provided by a computing resource service provide for use by the customer. The block-level forensics service or component thereof may monitor the logical volume based at least in part on a log generated as a result of the logical volume being implemented as a log-structured storage system. Operations to the log may be collected by the block-level forensics service and malicious activity may be detected based at least in part on operations to the log.

20 Claims, 9 Drawing Sheets

(56) References Cited

U.S. PATENT DOCUMENTS

| | | | |
|---|---|---|---|
| 2004/0250169 A1* | 12/2004 | Takemori | H04L 63/1425 714/38.1 |
| 2005/0265331 A1 | 12/2005 | Stolfo | |
| 2005/0289649 A1* | 12/2005 | Mitomo | H04L 63/10 726/22 |
| 2006/0010289 A1* | 1/2006 | Takeuchi | G06F 3/0605 711/114 |
| 2006/0053490 A1 | 3/2006 | Herz et al. | |
| 2007/0263553 A1 | 11/2007 | Bharali et al. | |
| 2007/0288247 A1* | 12/2007 | Mackay | G06Q 10/00 705/1.1 |
| 2008/0189793 A1 | 8/2008 | Kirkup et al. | |
| 2009/0007100 A1 | 1/2009 | Field et al. | |
| 2009/0070283 A1* | 3/2009 | Kang | G06N 99/005 706/45 |
| 2009/0125573 A1 | 5/2009 | Hardy | |
| 2010/0031093 A1 | 2/2010 | Sun et al. | |
| 2010/0075751 A1 | 3/2010 | Garvey et al. | |
| 2010/0161960 A1 | 6/2010 | Sadasivan | |
| 2011/0060725 A1 | 3/2011 | Lunde | |
| 2012/0260342 A1 | 10/2012 | Dube et al. | |
| 2013/0024567 A1* | 1/2013 | Roxburgh | G06F 11/3006 709/224 |
| 2013/0128751 A1 | 5/2013 | Keesara et al. | |
| 2013/0212709 A1 | 8/2013 | Tucker | |
| 2014/0029449 A1 | 1/2014 | Xu et al. | |
| 2014/0237599 A1 | 8/2014 | Gertner et al. | |
| 2014/0245423 A1 | 8/2014 | Lee | |
| 2014/0283085 A1 | 9/2014 | Maestas | |
| 2014/0331304 A1 | 11/2014 | Wong | |
| 2014/0351810 A1 | 11/2014 | Pratt et al. | |
| 2015/0043578 A1 | 2/2015 | Fidler et al. | |
| 2015/0081863 A1 | 3/2015 | Garg et al. | |
| 2015/0207813 A1 | 7/2015 | Reybok et al. | |
| 2015/0222656 A1 | 8/2015 | Haugsnes | |
| 2015/0264084 A1 | 9/2015 | Kashyap et al. | |
| 2015/0355957 A1 | 12/2015 | Steiner et al. | |
| 2015/0381641 A1 | 12/2015 | Cabrera et al. | |
| 2016/0119365 A1 | 4/2016 | Barel | |
| 2016/0191547 A1* | 6/2016 | Zafar | H04L 63/1416 726/23 |
| 2016/0306751 A1 | 10/2016 | Amarendran et al. | |
| 2017/0063927 A1 | 3/2017 | Schultz et al. | |
| 2017/0099195 A1 | 4/2017 | Raney | |
| 2017/0109310 A1 | 4/2017 | Takahashi et al. | |
| 2017/0155673 A1 | 6/2017 | Desai et al. | |
| 2017/0171231 A1 | 6/2017 | Reybok, Jr. et al. | |
| 2017/0279847 A1 | 9/2017 | Dasgupta et al. | |

OTHER PUBLICATIONS

U.S. Appl. No. 15/085,554, filed Mar. 30, 2016.
U.S. Appl. No. 15/085,271, filed Mar. 30, 2016.
U.S. Appl. No. 15/085,585, filed Mar. 30, 2016.
U.S. Appl. No. 15/085,608, filed Mar. 30, 2016.
Arpaci-Dusseau et al. "Log-structured File Systems," Operating Systems Version 0.91, www.ostep.org, 2014, 15 pages.
Rosenblum et al., "The Design and Implementation of a Log-Structured File System," University of California at Berkley, ACM Transactions on Computer Systems vol./Issue 10(1):26-52, Feb. 1992.
Check Point, "Firewall Administration Guide," Version R77, Dec. 6, 2015, found at http://dl3.checkpoint.com/paid/79/7916511f80908c3056af526bae304602/CP_R77_Firewall_AdminGuide.pdf?HashKey=1511120649_66bcd3456845e431d368a251b8d73769&xtn=. pdf., 13 pages.

* cited by examiner

TRANSPARENT VOLUME BASED INTRUSION DETECTION

CROSS REFERENCE TO RELATED APPLICATIONS

This application incorporates by reference for all purposes the full disclosure of co-pending U.S. patent application Ser. No. 15/085,271, filed Mar. 30, 2016, entitled "CORRELATING THREAT INFORMATION ACROSS MULTIPLE LEVELS OF DISTRIBUTED COMPUTING SYSTEMS," co-pending U.S. patent application Ser. No. 15/085,554, filed Mar. 30, 2016, herewith, entitled "CORRELATING THREAT INFORMATION ACROSS SOURCES OF DISTRIBUTED COMPUTING SYSTEMS," co-pending U.S. patent application Ser. No. 15/085,585, filed Mar. 30, 2016, entitled "BLOCK-LEVEL FORENSICS FOR DISTRIBUTED COMPUTING SYSTEMS," co-pending U.S. patent application Ser. No. 15/085,608, filed Mar. 30, 2016, entitled "HOST-BASED FIREWALL FOR DISTRIBUTED COMPUTER SYSTEMS," and co-pending U.S. patent application Ser. No. 15/085,257, filed Mar. 30, 2016, entitled "SOURCE SPECIFIC NETWORK SCANNING IN A DISTRIBUTED ENVIRONMENT."

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

In a large distributed computing system (e.g., multiple distributed data centers) of a computing resource service provider, various customers, users, services, and resources of the computing resource service provider are in frequent communication with each other. Keeping the system secure becomes more challenging as applications are updated and as the complexity and usage of the system increases. In such distributed computing systems, it can be difficult to identify the vulnerabilities of the system. Furthermore, it can also be difficult to isolate and troubleshoot issues with the system, and even when issues are identified, reliably securing the system may be challenging. Additionally, many conventional systems rely upon manual mitigation of such vulnerabilities. The complexity and distribution of computing resources in these environments may make it difficult to collect and analyze log information generated by the computing resources.

BRIEF DESCRIPTION OF THE DRAWINGS

Various techniques will be described with reference to the drawings, in which.

DETAILED DESCRIPTION

Figure 1:
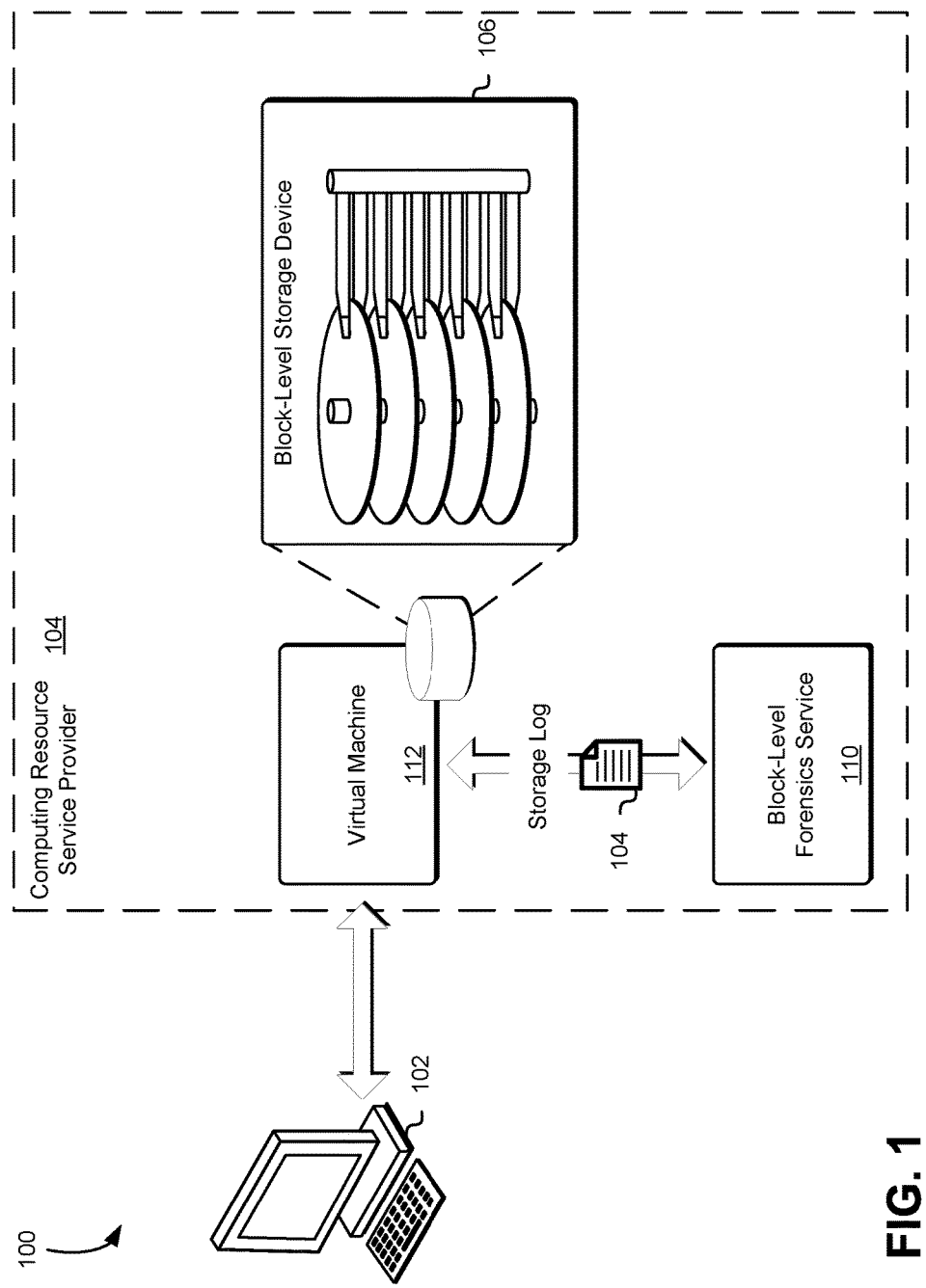
FIG. 1 illustrates an environment in which a block-level forensics service may analyze a log of a volume in a log-structured storage format in accordance with at least one embodiment.

In various examples described below, forensic analysis of various volumes is performed to determine information about the volume including whether the volume (and as a result computing resources utilizing the volume) has been compromised or otherwise subject to an attack. A computing resource service provider may provide computing resources such as virtual machines, remote data storage, networking resources, and a variety of other computing resources to customers. Customers may remotely and programmatically manage these computing resources to cause the resources to implement various applications. For example, a customer using a virtual machine can store data generated by a block-level storage service provided by the computing resource service provider. Furthermore, the customer may generate volume images (e.g., snapshots) which are loaded onto block-level storage devices and used to instantiate virtual machines or other computing resources. The volumes provided by the block-level storage service may be log-structured storage volumes.

Log-structured storage volumes store logs which are append-only sequences of data entries corresponding to blocks or locations within a particular volume. Whenever data is written, instead of finding a location for it on disk, other storage device, or virtualization thereof, the data is appended to the end of the log. The logs may be indexed and searchable. Furthermore, metadata updates may also be appended to the log. Reads to the log-structured storage volumes cause the virtual machine to find a root node of the index and the root node as it would in other systems that use disk-based or volume-based indexing. The logs may be contained in a circular buffer or otherwise trimmed or otherwise coalesced to reduce a size required to store the volume as a log-structured storage volume.

In one example, a customer can programmatically (e.g., through an API call) request a log-structured storage volume of a particular boot volume or other volume be created and attached to a virtual machine. Input/output (I/O) operations to the volume can be transmitted to the block-level storage service as a stream of log events to the log-structured storage volume. A block-level forensics service may subscribe to the stream of log events to the log-structured storage volume and analyze the volume based at least in part on the stream of log events. In addition, forensic analysis of the entire customer's volume image may be performed and information obtained from performing the forensic analysis may be stored. This information may be used during analysis and/or monitoring of the stream of log events and used to compare results obtained from forensic analysis of other customers' volume images. For example, forensic analysis of the customer's volume indicates a location of a critical operating system library; during monitoring of the stream of log events the block-level forensics service may detect an attempt to modify data at the location of the critical operating system library and transmit an alarm to an administrator.

In an illustrative example, one hundred customers are executing the same versions of a webserver. The block-level forensics service may analyze volume images of the one hundred customers' webservers and determine common elements among the volume images. The block-level forensics service uses this information to detect anomalous activity based at least in part on the steam of log events. For example, the block-level forensics service may analyze the stream of log events from the one hundred customers executing the webserver and determine that a particular log event is different than ninety-nine percent of the log events from the one hundred customers. This may indicate that the particular log event is anomalous and may be reported by the customer. In addition, the particular log event may be correlated with and/or compared with other information obtained by an intrusion detection system and/or the block-level forensics service. For example, the particular log event may coincide with network activity from an Internet Protocol (IP) address of a known attacker. This may indicate that the particular log event is a result of malicious activity.

The block-level forensic service may analyze and certify that particular volume images are safe and/or free from malware and then monitor I/O operations of the volume based at least in part on a stream of log events associated with the volume. The block-level forensic service may use the stream of log events to determine volume activity at the block level. This may provide lower latency analysis of a customer volume relative to performing a forensic analysis of an entire volume image or snapshot of a volume. In addition, information about the filesystem or other information about the volume may be determined or obtained to perform additional analysis beyond the block-level analysis of the volume. For example, the block-level forensics service may track multiple log events of the stream of log events to determine if sequential I/O operations are being performed. If sequential write operations are being performed, these write operations may be tracked and a determination may be made if the all or a portion of the write operations match a signature (e.g., hash) of known malware or other malicious executable code.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a block-level forensics service 110 may analyze and/or monitor a volume in accordance with at least one embodiment. A computing resource service provider 104 may provide computing resources, such as a virtual machine 112, to a customer 102. The computing resource service provider 104 may operate a plurality of data centers including distributed computing resources such as server computer systems described in greater detail below. The server computer systems may be connected to a network, such as the internet or other public network, to communicate with the customer 102. For example, the customer 102 of the computing resource service provider may utilize a network to communicate commands to computing resources of the computing resource service provider 104 causing the computing resources to implement the virtual machine 112 and a virtual network including a public and private subnet. Attackers may attempt to gain access to these computing resources and modify files, steal information, or otherwise interact with or operate these computing resources without authorization.

One such attack involves installing or otherwise loading malware or other malicious executable code onto a computing resource of the customer 102. For example, the customer's 102 virtual machine 112 may include and/or have access to a block-level storage device 106 (e.g., a hard disk drive) containing executable code of an operating system and other applications executed by the customer 102 using the virtual machine 112. Attackers may attempt to load malware and other malicious executable code onto a filesystem of the block-level storage device. The block-level storage device 106 may be configured to store data on platter surfaces in microscopic magnetic regions. In other embodiments, the block-level storage device 106 is a solid state drive (SSD) or a hybrid drive (e.g., a solid state and disk drive combination).

Manufacturers of the block-level storage device 106 typically configure the block-level storage device 106 to be treated as a single unit such that the storage capacity of the surfaces is aggregated and made available to a computer system (e.g., the virtual machine 112) as a single unit of storage capacity. As an example, the block-level storage device 106 may have ten surfaces on five platters, each of which is capable of storing 500 GB (gigabytes or 109 bytes) of data. The block-level storage device 106 may be made available to virtual machine 112 as a 5 TB (terabytes or $10^{12}$) storage device. As may be contemplated, the number of surfaces of a multi-platter disk and the storage capacity of those surfaces described herein are merely illustrative examples and other numbers of surfaces and storage capacities may be considered as within the scope of the present disclosure.

Furthermore, the block-level storage device 106 may store data in a log-structured storage system and/or filesystem. The log-structured storage system may be an append-only sequence of data entries stored on as a log on the block-level storage device 106. When new data is to be written, instead of finding a location corresponding to the data on the block-levels storage device (e.g., a location of a block on a platter of the block-level storage device106), the data is appended the end of the log or the current location of a log pointer. Indexing the data may be accomplished by treating the metadata in a similar manner. For example, metadata updates may also be appended to the log and may include a pointer to the data corresponding to the metadata. Read operations may begin at a root node of the log-structured storage system and locate data based at least in part on an index of the log. In addition, the log may be maintained in a circular buffer or otherwise trimmed to reduce an amount of physical space on the block-level storage device 106 required to maintain the log of the log-structured storage system. Log-structured storage systems and/or filesystems as described in greater detail in "The Design and Implementation of a Log-Structured File System," by John K, Rosenblum, Mendel and Ousterhout published in ACM Transactions on Computer Systems, Vol. 10 Issue 1. pp 26-52 Feb. 1992 and "Log-structured File Systems," by Arpaci-Dusseau, Remzi H., Arpaci-Dusseau, and Andrea C. in 2014, incorporated herein by reference.

In addition, a manufacture of the block-level storage device 106 may include "slack" space on the block-level storage device 106. Slack space may include any unused space in the block-level storage device 106 such as a disk cluster. Furthermore, operating systems may also include slack space in filesystems on block-level storage device 106. For example, DOS® and Windows® filesystems use fixed-size clusters. Therefore, even if the actual data being stored requires less storage than the cluster size, an entire cluster is reserved for the file. Specifically, if a partition size of the block-level storage device 106 is 2 GB and the cluster size is 32 KB, a file requiring only 4 KB will use an entire 32 KB cluster allocated by the filesystem, resulting in 28 KB of slack space. Attackers may load malicious software into this slack space which may be undetectable by the operating system of the virtual machine 112. The block-level forensics service 110 may be configured to, during analysis, search the slack space to determine if the slack space contains malicious software.

In another example, rather than making the 5 TB storage device described above available as a single 5 TB device, the block-level storage device 106 may be made available as ten logical drives, each of 500 GB. The block-level storage device 106 may also have each subset of a plurality of subsets of a set of platters of the block-level storage device 106 treated as an independent unit so that, for example, rather than making the 5 TB storage device described above available as a single 5 TB drive or making the drive available as ten logical drives, each of 500 GB, the drive may be made available as five logical drives, each of 2 GB (each including two surfaces), as four logical drives, each of 2.5 GB (each including three surfaces), or as a number of different sized logical drives (each including different numbers of surfaces). In this manner, the block-level storage device 106 may be utilized by a plurality of virtual machines or other computing devices as described in greater detail below.

As a result of the data being maintained in a log-structured storage system, data maintained in the block-level storage device 106 may be replicated using a variety of log replication methods such as chain replication. In addition, the log may be provided to a streaming service, described in greater detail below in connection with FIG. 5, or other endpoints, such as the block-level forensics service 110. The streaming service may be configured to transmit particular log events or types of log events to the block-level forensics service 110 for analysis. For example, all write events to the log associated with the block-level storage device 106 may be streamed or otherwise provided to the block-level forensics service 110. The block-level forensics service 110 may then analyze the write events to detect malicious activity. For example, the block-level forensics service 110 may determine one or more differences between the log corresponding to the block-level storage device 106 and a log corresponding to standard boot volume. In another example, the block-level forensics service 110 may determine a set of offsets or locations in the log corresponding to system binaries or other system critical files and determine if a received log event is attempting to or has already modified data at the set of offsets or locations. In addition, the block-level forensics service 110 may examine and/or analyze metadata associated with and/or included in the log events to determine if a particular log event (e.g., an operation on the logical volume) is associated with malicious activity. In various other embodiments, such as those described below in connection with FIG. 6, analysis of the log event is in-line with I/O processing such that I/O operations are not committed to the log without first determining whether the I.O operation is associated with malicious activity.

If the block-level forensics service 110 detects malicious activity, the block-level forensics service may transmit an alarm, transmit a notification, isolate the virtual machine 112, reload/restore a volume image to the virtual machine 112, terminate the virtual machine 112, or any other operation suitable for mitigating the malicious activity. For example, the block-level forensics service 110 detects malware has been written to the block-level storage device 106 based at least in part on a signature or hash one or more log events containing data written to the log. The signature may include any information capable of identifying malware or a portion thereof. In addition, a single signature may identify malware and non-malicious executable code. The signature may include a hash as described above, but may also include the executable code of the malware itself. For example, the signature may include operating system page files or combinations of possible operating system page files corresponding to a particular malware application. Specifically, if an operating system page file is 4 KB, the signature may include every possible arrangement of the malware's executable code in 4 KB page files. The block-level forensics service 110 determines additional information associated with the malware such as a source of the malware, a distributor of the malware. This may include network telemetry or other data that has been collected by the block-level storage device or other system of the computing resource service provider 104, such as a security service or agent as described in co-pending U.S. patent application Ser. No. 15/085,271, filed concurrently herewith, entitled "CORRELATING THREAT INFORMATION ACROSS MULTIPLE LEVELS OF DISTRIBUTED COMPUTING SYSTEMS" or co-pending U.S. patent application Ser. No. 15/085,608, filed concurrently herewith, entitled "HOST-BASED FIREWALL FOR DISTRIBUTED COMPUTER SYSTEMS," herein incorporated by reference. The additional information, such a network telemetry, may enable to block-level forensics service 110 to determine if the virtual machine 112 has been communicating with a distributor of the malware or potential locations the malware is likely to be distributed to next. In addition, this information may be used to block or otherwise shut down network traffic to and from the distributor of the malware or potential locations/targets of the malware. In some embodiments, a notification may be sent to an administrator to determine a course of action.

As illustrated in to FIG. 1, the customer 102 communicates with the virtual machine 112 and may request that the block-level forensics service 110 analyze the customer's block-level storage device, which may be partially or completely virtualized. However, as described above, in a multi-tenant environment such as the environment 100 including the computing resource service provider 104, the customer 102 may only utilize a portion of the block-level storage device 106. As a result, log-structured storage information 104 (e.g., log events or a portion of the log corresponding to the block-level storage device 106) may be provided to the block-level forensics service 110. This may include a stream of log events or other data structure suitable for providing the log-structured storage information 104 to the block-level forensics service 110. The block-level forensics service 110 may then analyze the log-structured storage information 104 and return block-level forensics information 108 to the customer or other system of the computing resource service provider 104. Although as illustrated in FIG. 1, the log-structured storage information 104 is provided through the virtual machines 112, other mechanisms for providing the log-structured storage information 104 may be used in accordance with the present disclosure, such as the management console described in greater detail below in connection with FIG. 2 or a streaming service described in greater detail below in connection with FIG. 6.

The block-level forensics service 110 may generate block-level forensics information which may include evidence or other information obtained from computing resources and digital storage media such as the block-level storage device 106. The block-level forensics service 110 may be configured to, in a forensically sound manner, analyze volume images to identify, preserve, recover, and present information about the volume images. In various embodiments, evidence is obtained from the block-level forensics service 110 and subjected to the same guidelines and practices imposed by various legal jurisdictions. The block-level forensics service 110 may utilize a variety of different block-level forensics tools to analyze volume images. Disk forensic tools may include a variety of commercial and open source software packages and/or applications such as Autopsy, Bulk Extractor, gfzip, hasdb, Scalpel, Sleuthkit, Nuix Desktop®, and WindowsSCOPE®.

The volume images (e.g., log-structured storage information 104) utilized by the block-level forensics service 110 may include computer files containing the contents and structure of a volume or an entire data storage device, such as a hard disk drive, tape drive, floppy disk, optical disc or other storage devices. The volume images may be generated by creating a sector-by-sector copy of the source medium, thereby replicating the structure and contents of the storage device independent of the filesystem (e.g., a copy of the log corresponding to the block-level storage device 106). In various embodiments, depending on the volume image format, a volume image may span one or more computer files. Volume image file formats may be open standards, such as the ISO image format for optical disc images, or proprietary to particular software applications. The volume image may include the entire partition allotted to the customer 102 or may include only a portion of the entire partition allotted to the customer 102. For example, known files such as the operating system may be omitted from the volume image.

Upon obtaining the log-structured storage information 104 the block-level forensics service 110 may analyze the log-structured storage information 104 to generate the block-level forensics information by at least recreating the volume from the log-structured storage information 104 (e.g., recreating the current state of the block-level storage device 106 from the log of events to the block-levels storage device 106). For example, the block-level forensics service 110 can obtain timing and life-cycle information from I/O operations stored in the log-structured storage format. The block-level forensics service 110 may also track file frequency across customers and generate a histogram of file frequency for particular files. The histogram may provide an indication as to what file in the volume may contain malicious software. For example, if a particular file is located in 99% of customer volumes this may be an indication that the file does not contain malicious code. In another example, if a particular file in a boot volume in a customer is unique to the customer this may indicate malicious activity.

Returning to the example above, files on the volume may have multiple time stamps associated with the files. These time stamps may be included as metadata associated with the file referred to as MAC times ("Modified Access Change"). The MAC times may indicate a particular time where the file was accessed, file contents were modified, or the metadata associated with the file was altered. This information may be extracted by the block-level forensics service 110 during analysis of the volume image and combined information obtained from an intrusion detection system, a logging system, or other system suitable for monitoring the operations of computing resources. For example, time stamps of events within the filesystem are correlated with time stamps of network activity, process activity, or other activities recorded by the intrusion detection system.

The block-level forensics service 110 may also generate a list of I/O operations (e.g., block-level operations) or other data objects on a volume, or volume image thereof, that may be ignored. This may enable the block-level forensic service 110 to be more efficient in responses to the customer 102. For example, the customer 102 transmits a request to the block-level forensics service 110 to analyze a volume image of the virtual machine 112. The block-level forensics service 110 can then determine that there are 100,000 files on the volume image and 80,000 files came from a parent volume image (e.g., volume image from which the volume image of the virtual machine 112 was modified as described above) which has previously been verified and may be ignored when a log event is received accessing the location of these files. In addition, the block-level forensics service 110 may determine information associated with the 20,000 files that where modified, such as when the files where modified or in the version of a volume image where the files were modified. For example, the customer 102 may use a standard volume image and modify it for use with the virtual machines 112. The customer 102 or another customer may then modify the volume image for use as a web server. The block-level forensics service 110 may analyze each volume image and determine from which modification each of the files on the volume image originated. Files or other data objects, which may be flagged as malware or malicious code by the block-level forensics service 110, may then be tracked across customers and computing resources.

In some embodiments, the block-level forensics service 110 mounts volume images as read only to avoid inadvertently modifying the volume corresponding to a volume image to determine information about the volume prior to monitoring or analyzing the stream of log events associated with the virtual machine 112 and the block-level storage device 106. A public key or other cryptographically verified information may be applied to the block-level forensics information to verify the identity and authenticity of the data. In addition, the customer's 102 volume image may be encrypted and the block-level forensics service 110 may require access to the encryption key to perform the analysis. The encryption key may be maintained in a security module or security service (not illustrated in FIG. 1 for simplicity) of the computing resource service provider 104. In these embodiments, the block-level forensics service 110 gains access to the key by obtaining credential information from the customer 102 and may also obtain key identification information if necessary. Alternatively, the customer 102 may maintain the key and provide the block-level forensics service 110 with the key. In yet other embodiments, the customer 102 grants the block-level forensics service 110 access to the stream of log-events associated with the customer 102, virtual machine 112, block-level storage device 106, or some combination thereof. For example as described in greater detail below in connection with FIG. 2, the customer 102, through a management console, grants the block-level forensics service 110 access to the log-structured storage system for particular volumes operated by the customer which may include a stream of log-event of operations of the log-structured storage system.

Returning to the block-level storage device illustrated in FIG. 1, as used herein, the term "platter" may refer to a physical medium, typically disk shaped, upon which data may be stored using a magnetic medium. Data may be stored on the platter by changing one or more magnetic characteristics of portions of the medium. A multi-platter disk may include a disk with a single platter where such a disk has two usable surfaces (i.e., a top surface and a bottom surface). Also as used herein, a "usable surface" of a platter is a platter upon which data may be stored as described herein. For example, in a hard disk drive, the top surface of the top platter and/or the bottom surface of the bottom platter may not be usable surfaces because there may be no read/write heads for these surfaces due to geometry constraints. In such an example, the top surface of the top platter and the bottom surface of the bottom platter may not be usable surfaces.

Data may be retrieved from the surface (e.g., may be read from the surface) and/or may be stored on the surface (e.g., may be written to the surface) as a result of an access request (which may also be referred to herein as an "input-output (I/O) request"). An access request may specify a logical unit number or other logical address that may correspond to one or more surfaces associated with the access request. The access request (or input-output request) may be fulfilled by the multi-platter disk by providing access to the surface or surfaces corresponding to the logical unit number or other logical address of the access request for reading and/or writing data to the corresponding surface or surfaces.

An access request to read and/or write data to the surface (or surfaces) may be received by the multi-platter disk. Based on the logical address associated with the access request, the data may be retrieved (or read) from the surface or surfaces and/or may be stored on (or written to) the surface or surfaces that correspond to the logical address specified by the access request. Similarly, an access request to read data from the surface may be received by the multi-platter disk and such an access request may also have a logical unit number or other logical address associated with the access request. The data may then be read from the surface corresponding to the surface or surfaces corresponding to the logical address associated with the access request. A logical unit address may, for example, be a logical unit number of a small computer system interface protocol. The access request may be based on a user-specified logical address protocol or user-defined logical address protocol that may be based on, for example, the surface number, the platter number, the disk number, or some other criteria.

A user-specified logical address protocol (or user-defined logical address protocol) is a custom protocol that may be used to determine the surface or surfaces associated with an access request. For example, a multi-platter disk may have six surfaces and a user may first specify (using, for example, a user interface or an application programming interface request) that surface one may correspond to a first logical address, that surfaces two and three may correspond to a second logical address, and that surfaces four, five, and six correspond to a third logical address. Such a user-specified logical address protocol allows for access requests using any of the three logical addresses and, by using the correct logical address, each of the sets of surfaces may be treated as an independent unit. The user may select a different user-specified logical address protocol (or user-defined logical address protocol) that may, for example, treat each platter (or each surface) as an independent unit using a user interface and/or an application programming interface request.

In some embodiments, customers and/or the computing resource service provider can create volume images for use as a base image for instantiating virtual machine 112 or other computing resources. These base images may be analyzed for malware and other malicious software. In addition, if these base images are found to be free of malware and other malicious software they may be made available to other customers who may use the base image as is or modify the base image as needed. Furthermore, the modified base images may be analyzed by the block-level forensics service 110 and history and/or life-cycle information for the volume images and/or files on the volume images may be generated. In this manner, changes to the volume images may be traced and correlated with other intrusion detection information. For example, the customer's 102 virtual machine 112 provides the block-level forensics service 110 with access to the stream of log-events (e.g., operations) of the block-level storage device 106, the block-level forensics service 110 then determines that a library file of an operating system of the virtual machine 112 was modified based at least in part on one or more log events. This information is combined with additional information from a host-based firewall or other intrusion detection system to determine that just before the library file was modified the virtual machine 112 established a connection with an unknown computer system. This information may be provided to the customer 102 and/or additional actions may be taken to mitigate the detected attack and possible attackers operating the unknown computer system.

Figure 2:
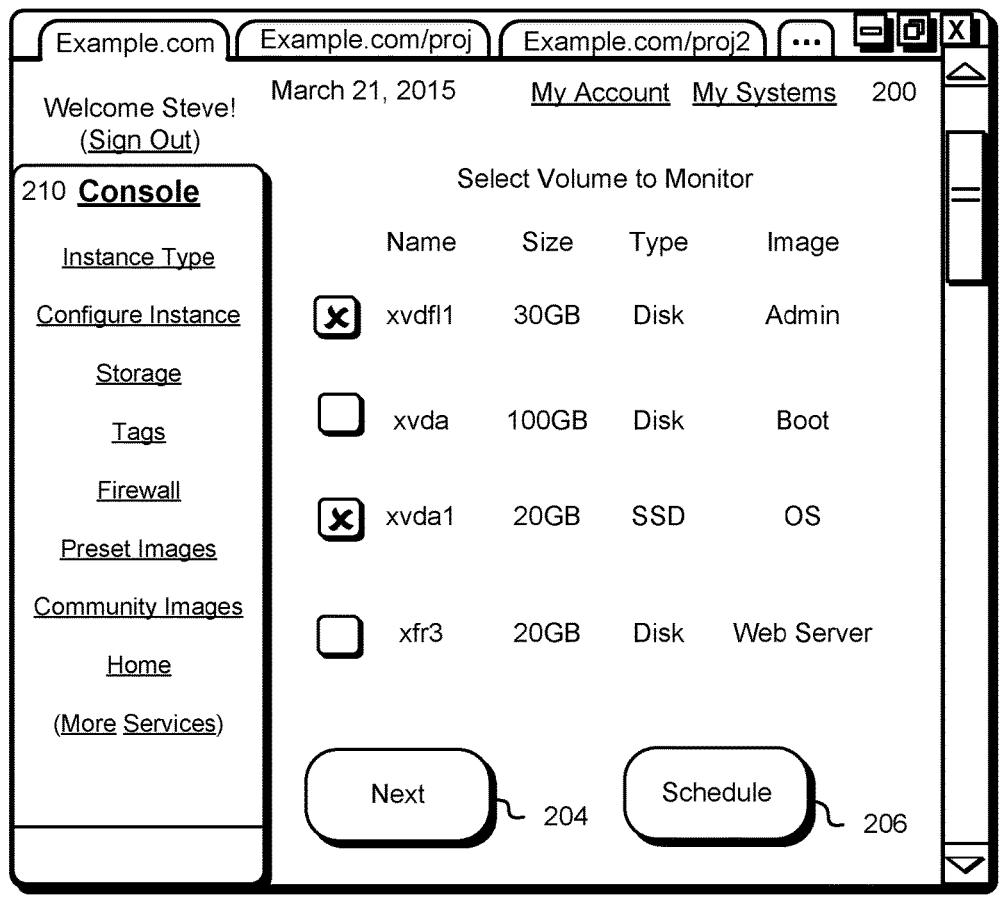
FIG. 2 is a diagram illustrating a management console exposed as a webpage for managing volumes in accordance with at least one embodiment.

FIG. 2 shows a webpage 200 which may be displayed by an application executed by a computing system enabling a customer to interact with a block-level forensics service operated by the computing resource service provider. As illustrated in FIG. 2, the webpage 200 includes various graphical user interface elements that enable customers to select one or more log-structured storage volumes associated with computing resources to perform forensics analysis and/or monitoring through a management console of which the webpage 200 is a part. In various embodiments, the customer interacts with the block-level forensics service by issuing commands through the management console. The webpage 200 may be displayed by various applications, such as a mobile application or web browser. In this example, the webpage 200 includes various navigational features. For instance, on the left-hand side of the webpage 200, various links 210 may link to one or more other webpages that contain additional content corresponding to a variety of different actions the customer may cause to be performed.

The console pages may correspond to operations that may be taken to manage or otherwise control the block-level forensics service or other computing services of the computing resource service provider. In this example, the links appear as textual words which enable the links to be selected using an appropriate input device such as a keyboard, mouse, touchscreen or other input device. Selection of one of the links 210 may cause an application displaying the webpage 200 to submit, pursuant to a Uniform Resource Locator (URL) associated with the selected link by the programming of the webpage 200, a Hypertext Transfer Protocol (HTTP) request for the content associated with the link to a server that provided the webpage 200 or another server.

In this example, the webpage 200 also includes a graphical customer element configured as a "next" button 204. The next button 204 may be a graphical user interface element of the webpage 200 where the underlying code of the webpage 200 is configured such that selection by an input device of the execute button 204 causes information corresponding to the selection of a particular volume image selected on the webpage 200 to be transmitted to the block-level forensics service or other service of the computing resource service provider. For example, selecting the next button 204 may cause a block-level forensics service to receive the customer's selection of volume images and, as a result, may cause the block-level forensics service to begin to monitoring and/or analyzing the log-events associated with the volume images corresponding to the customer's selection. In another example, selecting the next button 204 may cause a block-level forensics service to request access to one or more event streams including log-events associated with the volume images corresponding to the customer's selection.

Furthermore, through the management console, the customer may be guided through the process of selecting particular volume images to be analyzed by the block-level forensics service. For example, the customer may be prompted to select volume images that have not yet been analyzed by the block-level forensics service. In addition, the customer may limit or select particular portions of volume images to be analyzed by the forensics service. For example, the customer may request that the block-level forensics service only analyze changes to the volume image performed after a particular date and time. The process may be divided into steps and the customer may be prompted to provide information at each step. For example, the webpage 200 displays to the customer a list of different types of computing systems with associated volume images. The customer, using an input device, may select a set of computing systems to provide the block-level forensics service with volume images of for analysis. The customer selection may be stored until the entire process is completed or the customer selection may be transmitted to the block-level forensics service upon selection of a graphical user interface element.

As illustrated in FIG. 2, the webpage 200 may contain a graphical user interface element configured as icons displaying information associated with the computing resources operated by the customer that may contain and/or have associated with it one or more volume images. The icons may correspond to a particular computing resource utilized and/or available to the customer. The webpage 200 may also include a graphical customer element configured as a "schedule" button 206. The schedule button 206 may be a graphical user interface element of the webpage 200 where the underlying code of the webpage 200 causes the application displaying the webpage 200 to display additional information (not shown in FIG. 2 for simplicity) that enables the customer to schedule block-level forensic operations for selected volumes. For example, the customer may schedule forensic analysis of one or more logical volumes to be performed periodically or aperiodically by the block-level forensics service. In addition, the customer, computing resource service provider, or other entity may determine a schedule for a particular logical volume. The schedule may include various event driven triggers. For example, when a customer creates a new boot volume or new version of an existing boot volume, this event may be scheduled to trigger forensic analysis. In another example, monitoring of a particular volume may be paused or halted during update operations to system critical software or other software included in the volume.

Once the customer has made a selection using the webpage 200 and selected the next button 204, the application displaying the webpage 200 may submit an HTTP request to the block-level forensics service to request the volume images for the computing resources included in the selection. The request may be transmitted to one or more services of the computing resource service provider, such as a stream service or log service described in greater detail below. Furthermore, the block-level forensics service may obtain additional information from one or more other services in order to complete the request from the customer. For example, the block-level forensics service may obtain credentials from a policy service to access the computing resources and/or other services of the computing resource service provider. In various embodiments, the block-level forensics service or other service of the computing resource service provider returns, in response to the HTTP request from the customer, identification information configured to identify block-level forensics information provided in response to the customer's HTTP request such that the customer may obtain any block-level forensics information based at least in part on the identification information.

In one example, the customer may select volume images for monitoring for intrusion detection purposes. The selection by the customer may cause the block-level forensics service to execute a preliminary analysis of the volume image prior to monitoring. This may allow the block-level forensics service to determine information corresponding to the volume such as the location of system critical files.

Figure 3:
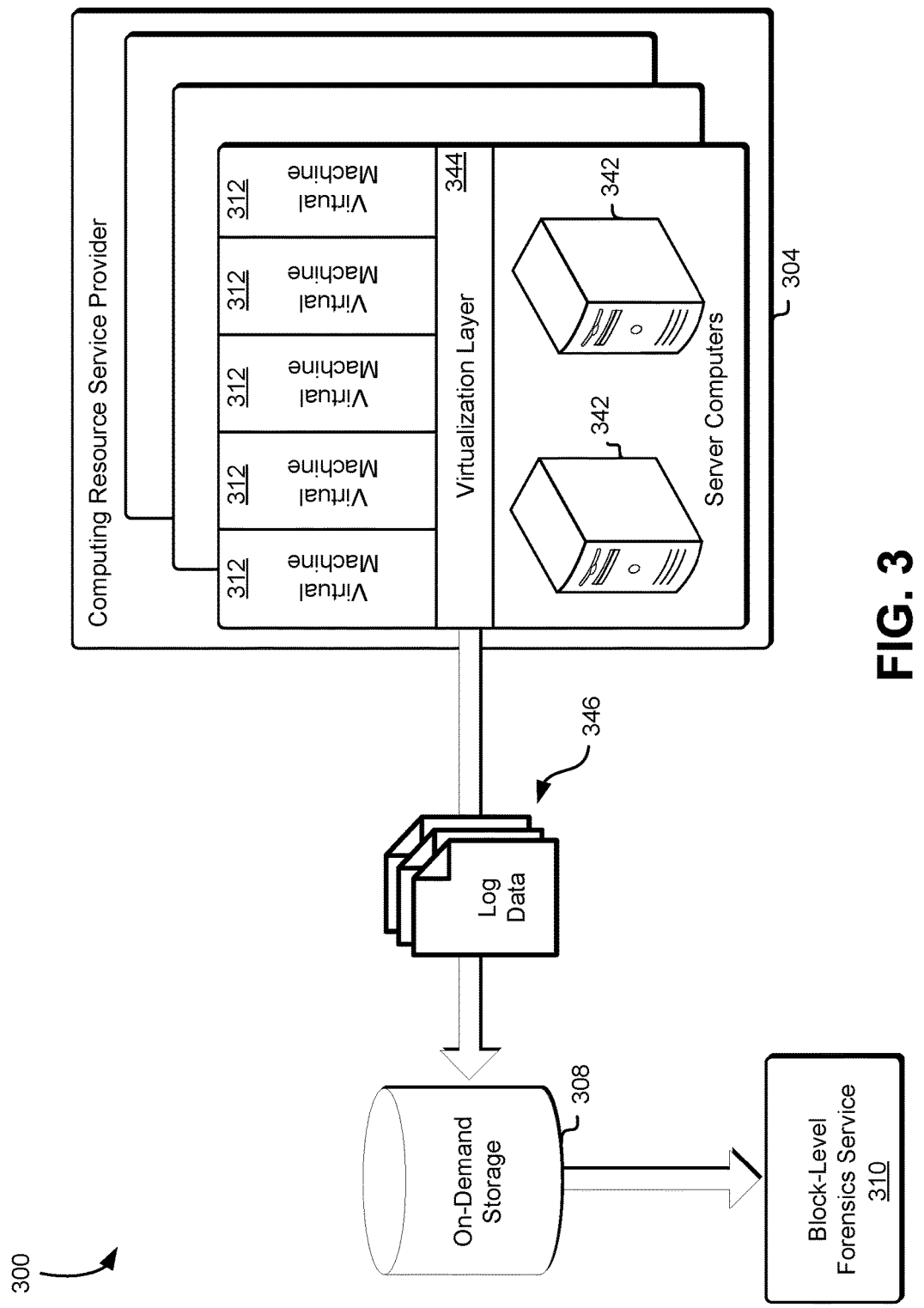
FIG. 3 illustrates an environment in which a block-level forensics service may analyze a log of a volume in a log-structured storage format volume in accordance with at least one embodiment.

FIG. 3 illustrates an environment 300 in which a block-level forensics service 310 of a computing resource service provider 304 may obtain log data 346 in accordance with at least one embodiment. The block-level forensics service 310, which may be implemented by physical hardware, is used by the computing resource service provider 304 to provide block-level forensics information to customers and/or other services of the computing resource service provider 304 and to perform monitoring of volumes associated with virtual machines 312. The block-level forensics service 310 may include a group of computing systems, such as the server computers 342 described in detail below, configured to generate block-level forensics information based at least in part on log data 346 obtained from customers or other services of the computing resource service provider 304, such as a stream service described in greater detail below in connection with FIG. 5. The physical hardware may include a server computer 342. The server computer 342 may be any device or equipment configured to execute instructions for performing data computation, manipulation, or storage tasks, such as a computer or a server. A server computer 342 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as block-level storage devices, storage disks and tapes, networking equipment, and the like.

A virtualization layer 344 may include a bare metal hypervisor or a hosted hypervisor. The virtualization layer 344 executing on the server computer 342 enables the physical hardware to be used to provide computational resources upon which one or more virtual machines 312 or other computing resources may operate. For example, the virtualization layer 344 enables a particular virtual machine 312 to access physical hardware on the server computer 342 through virtual device drivers or other executable code on the virtual machine 312. In another example, the block-level storage device 106 described above in FIG. 1, can be virtualized and provided to the virtual machine 312 through a virtual device driver. The virtualization layer 344 may include a hypervisor or virtualization software and/or hardware. The virtualization layer 344 may also include an instance of an operating system dedicated to administering the virtual machine 312 or other computing resource executing on the server computer 342. Each virtualization layer 344 may include its own networking software stack, responsible for communication with other virtualization layers 344 and, at least in some embodiments, also responsible for implementing network connectivity between the virtual machine 312 or other computing resources executing on the server computer 342 and virtual machine 312 or computing resources executing on other server computers 342.

Furthermore, the server computer 342 may host multiple virtualization layers 344 of the same or different types on the same server computer 342 as well as virtual machine 312 of the same or different types. For example, a server computer 342 may host a first virtual machine 312 instantiated from a first volume image and operated by a first customer and may host a second virtual machine 312 instantiated from a second volume image that is operated by a second customer. The virtualization layer 344 may be any device, software, or firmware used for providing a virtual computing platform and/or virtualized computing resources for the virtual machine 312 and/or component thereof. The virtual computing platform may include various virtual computer components, such as one or more virtual CPUs, virtual memory, virtual disk storage, and the like. The virtual machine 312 may be provided to the customers or other service of the service provider 304 and the customers may utilize the virtual machine 312 or components thereof. Further, the computing resource service provider 304 may use one or more of its own virtual machines 312 for supporting execution of its applications and providing computing resources for such applications.

Commands and other information may be included in an application program interface (API) call from the block-level forensics service 310 or an on-demand storage service 308, described in greater detail below, to the virtualization layer 344. The block-level forensics service 310 enables the customers and other services of the computing resource service provider 304 to manage and operate analysis of various log data 346 generated based at least in part on virtual machines 312 or other computing resources. For example, the client may transmit a request to the block-level forensics service 310 for block-level forensics information corresponding to a virtual machine 312 based at least in part on an analysis of log data 346 corresponding to the virtual machine 312.

The request may be an API call including information corresponding to the customer, the on-demand storage service 308, or the particular virtual machine 312. The block-level forensics service 310 may determine the corresponding virtualization layer 344 for the virtual machine 312 included in the request and transmit a command to the virtualization layer 344 to obtain log data 346 corresponding to the virtual machine 312 and store the log data 346 in the on-demand storage service 308. Alternatively, the virtualization layer 344 may be configured to provide a copy of the log data 346 to a stream service or directly to the block-level forensics service 310. The log data 346 may include I/O operations execute by the virtual machine 312.

The log data 346 may be stored in multiple locations for the purpose of durability. Furthermore, the log data 346 may include modification to the logical volume and/or virtual machine. For example, a customer, since the last volume image was generated, may have modified only a portion of the logical volume (e.g., 4 blocks of the logical volume), virtualization layer 344 or another component of the computing resource service provider 304 may generate log data 346 based at least in part on the portion of the logical volume that has been modified. This may reduce an amount of data that must be obtained to generate the log data 346 and may enable the block-level forensics service 310 to determine a time-line or history of modifications to the logical volume and/or virtual machine 312. For example, the block-level forensics service 310 may use the time-line information to determine in what version of a logical volume (e.g., boot volume) a particular file was modified that may be associated with malicious activity.

In yet other embodiments, a separate process (not shown in FIG. 3 for simplicity) is used to generate log data 346 corresponding to the virtual machines 312 or other computing resources. In these embodiments, the separate process generates the log data 346 using computing resources of the server computer 342 or component thereof and stores log data 346 in one or more storage devices of the on-demand storage service 308. The separate process may be a process or other executable code supported by the virtualization layer 344. The on-demand storage service 308 may be a group of computer systems configured to store log data 346 that is accessible to one or more other computer systems, such as the block-level forensics service 310. In this way, log data 346 maintained by the on-demand storage service 308 may be accessed by the block-level forensics service 310 and/or customers. The on-demand storage service 308 may be a data warehouse or a non-queryable data storage system. A data storage system and/or data storage device is queryable if the data storage system and/or data storage device enable requestors to submit data queries and receive response to the submitted data queries. For example, the on-demand storage service 308 may include a database, such as an Structured Query Language (SQL) database, which enables the customer, the block-level forensics service, or other services of the computing resource service provider 304 to query the on-demand storage service 308 for information contained in or associated with the log data 346 and stored by the on-demand storage service 308. In another example, the on-demand storage service 308 may be non-queryable in so much as the on-demand storage service 308 stores log data 346 (e.g., volume images) as data objects which are obtainable by a data object identifier, such as a file name or key, but does not enable queries on information contained in the on-demand storage service 308.

The on-demand data storage service 308 may be a collection of computing resources configured to synchronously process requests to store and/or access data. The on-demand data storage service 312 may operate using computing resources (e.g., databases) that enable the on-demand data storage service 312 to locate and retrieve data quickly, to allow data to be provided in response to requests for the data. For example, the on-demand data storage service 312 may maintain stored data in a manner such that, when a request for a data object is retrieved, the data object can be provided (or streaming of the data object can be initiated) in a response to the request. As noted, data stored in the on-demand data storage service 312 may be organized into data objects. The data objects may have arbitrary sizes except, perhaps, for certain constraints on size. Thus, the on-demand data storage service 312 may store numerous data objects of varying sizes. The on-demand data storage service 312 may operate as a key value store that associates data objects with identifiers of the data objects that may be used by the customer to retrieve or perform other operations in connection with the data objects stored by the on-demand data storage service 312.

The block-level forensics service 310 may be responsible for processing log data 346 obtained from the on-demand storage service 302. For example, the block-level forensics service 310 may obtain log data 346 from the on-demand storage service 308 and may analyze log events included in the log data 346 to detect malicious activity. Information corresponding to this analysis may then be stored such that it is accessible to the customer or other services of the computing resource service provider 304 to be used to detect and mitigate threats.

Figure 4:
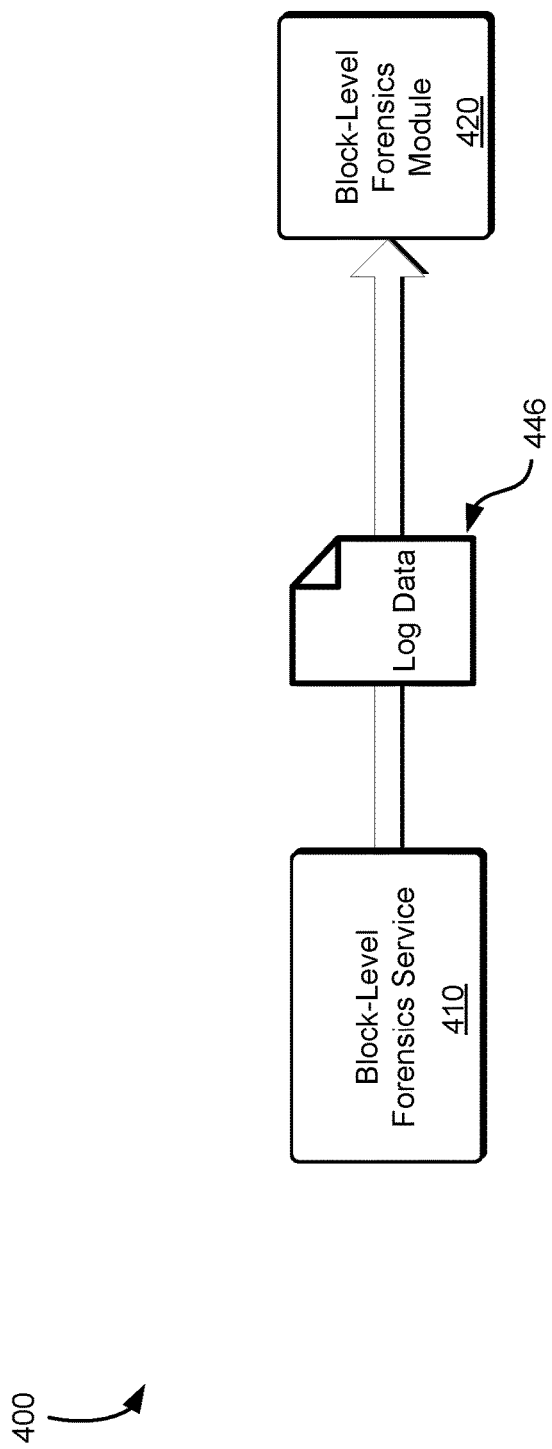
FIG. 4 illustrates an example environment in which a block-level forensics service may analyze a log of a volume in a log-structured storage format volume in accordance with an embodiment.

FIG. 4 illustrates an environment 400 in which a block-level forensics service 410 of a computing resource service provider may perform forensics analysis on log data 446 in accordance with at least one embodiment. The block-level forensics service 410, which may be implemented by physical hardware, is used by the computing resource service provider to perform block-level forensics and similar analysis on log data 446 (e.g., block-level operations included in log-structured storage) on behalf of customers and/or other services of the computing resource service provider. The block-level forensics service 410 may include a group of computing systems, such as the server computers described in detail below, configured to generate block-level forensics information based at least in part on log data 446 obtained from customers or other services of the computing resource service provider by at least performing forensic analysis of the log data 446.

The physical hardware may include a server computer. The server computer may be any device or equipment configured to execute instructions for performing data computation, manipulation, or storage tasks, such as a computer or a server. A server computer may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as block-level storage devices, storage disks and tapes, networking equipment, and the like. In addition, the server computers may contain specialized hardware for performing block-level forensics such as high capacity hard disk drives and security dongles for performing forensic analysis.

A virtualization layer may include a bare metal hypervisor or a hosted hypervisor. The virtualization layer executing on the service computer enables the physical hardware to be used to provide computational resources upon which one or more block-level forensics modules 420 or other computing resources may operate. For example, the virtualization layer enables a particular block-level forensics module 420 to access physical hardware on the server computer through virtual device drivers or other executable code on the block-level forensics module 420. The virtualization layer may include a hypervisor or virtualization software and/or hardware. The virtualization layer may also include an instance of an operating system dedicated to administering the block-level forensics module 420 or other computing resource executing on the server computer. Each virtualization layer may include its own networking software stack, responsible for communication with other virtualization layers and, at least in some embodiments, also responsible for implementing network connectivity between the block-level forensics module 420 or other computing resources executing on the server computer and block-level forensics module 420 or computing resources executing on other server computers.

Furthermore, the server computer may host multiple virtualization layers of the same or different types on the same server computer as well as block-level forensics module 420 of the same or different types. For example, a server computer system may host a first block-level forensics module 420 instantiated from a first volume image and may host a second block-level forensics module 420 instantiated from a second volume image. The virtualization layer may be any device, software, or firmware used for providing a virtual computing platform and/or virtualized computing resources for the block-level forensics module 420 and/or component thereof. The virtual computing platform may include various virtual computer components, such as one or more virtual CPUs, virtual memory, virtual disk storage, and the like. The block-level forensics module 420 may be provided to the customers or other service of the computing resource service provider and the customers may utilize the block-level forensics module 420 or components thereof to perform forensic analysis.

Returning to FIG. 4, the block-level forensics module 420 may include a storage device. In addition, the block-level forensics module 420 may be operated by or part of the block-level forensics service 410. The storage device may include one or more block-level storage devices (and/or virtualizations thereof). The block-level storage devices may, for instance, be operationally attached to block-level forensics module 420 and provided by a block-level data storage service which provides the storage device as a logical unit (e.g., virtual drives). The block-level storage device may enable the persistent storage of data used/generated by the block-level forensics module 420. In various embodiments, the storage device is a virtual device supported by the virtualization layer which enables the block-level forensics module 420 to access a physical block-level storage device of the server computers through the storage device (e.g., virtual device). The block-level forensics module 420 may include software or other executable code loaded into memory of the block-level forensics module 420 that, when executed by one or more processors of the block-level forensics module 420, cause the block-level forensics module 420 to perform analysis of at least a portion of log data 446 obtained by the block-level forensics module 420.

Commands and other information may be included in an application program interface (API) call from the block-level forensics service 410 to the virtualization layer. The block-level forensics service 410 may obtain log data 446 as described above in connection with FIG. 3. In response to a command to analyze particular log data 446, the block-level forensics service 410 may transmit an API call to the virtualization layer, causing the virtualization layer to load the log data 446 into the storage device. In yet other embodiments, the block-level forensics service 410 may perform analysis of log data without a corresponding command from a customer. In addition, the block-level forensics service 410 may be configured to communicate directly with the block-level forensics module 420 and may not transmit commands to the virtualization layer. For example, the block-level forensics service 410 can provide the log data 446 directly to the block-level forensics module 420, and the block-level forensics module 420 may analyze at least a portion of the log data 446 to detect malicious activity.

The command to analyze the log data 446 may be an API call including information corresponding to the log data 446, the customer, an on-demand storage service, a location of the log data 446, or other information suitable for analyzing the log data 446. The block-level forensics service 410 may transmit a command to the block-level forensics module 420 to perform analysis of the log data 446. The analysis may include a variety of forensic analysis techniques as described herein and configured to detect malicious activity based at least in part on the log data 446, reconstruct a filesystem of the log data 446, or determine other information associated with the log data 446. The block-level forensics module 420 may be configured to return a result of the analysis of the log data 446 to the block-level forensics service 410. For example, the block-level forensics module 420 may return a result to the block-level forensics service 410 indicating that a particular operation included in the log data is associated with malicious activity based at least in part on a score or other metric associated with the particular type and/or location of the particular operation.

Figure 5:
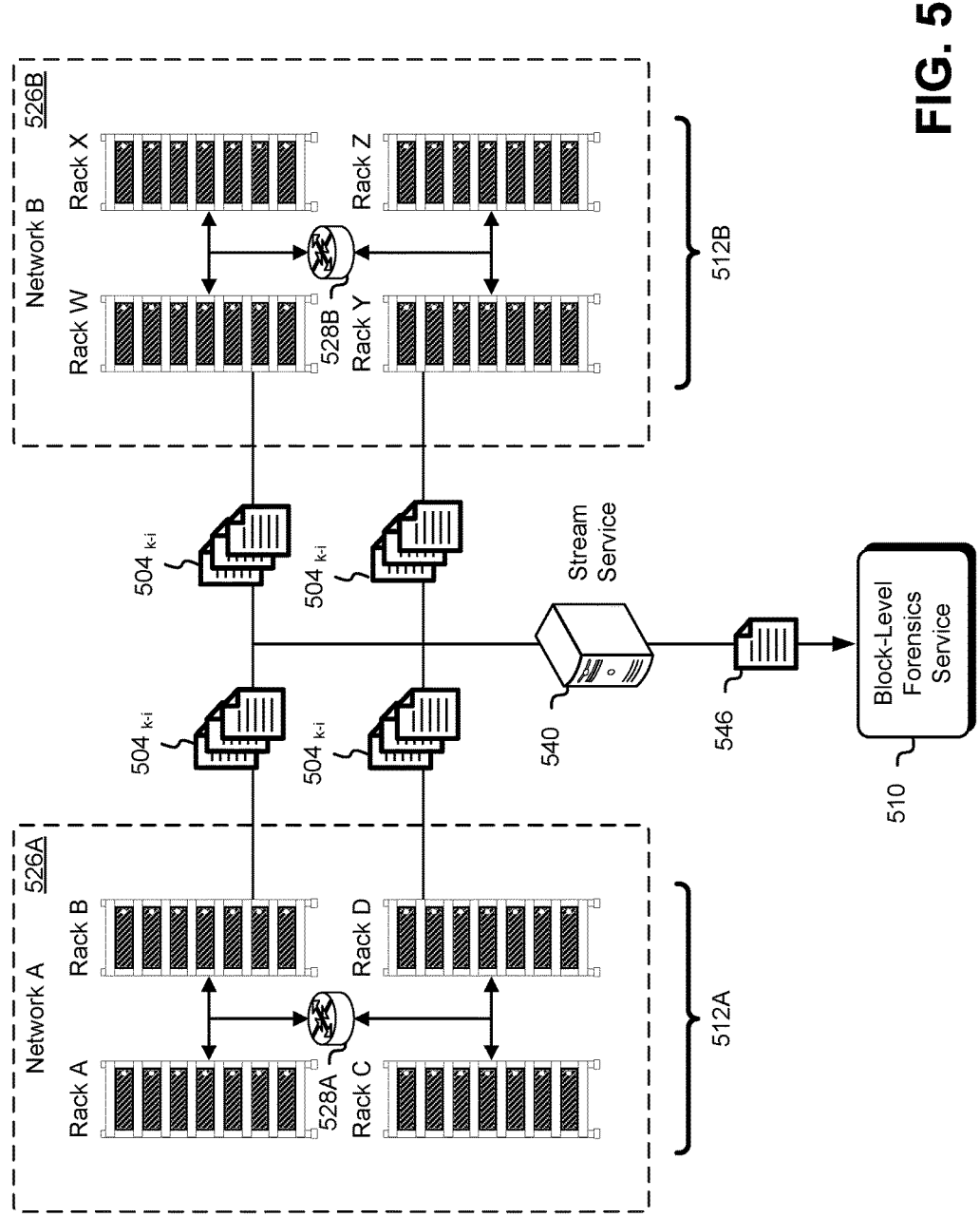
FIG. 5 illustrates an example environment in which a block-level forensics service may analyze a log of a volume in a log-structured storage format volume in accordance with an embodiment.

FIG. 5 illustrates an aspect of an environment 500 in which an embodiment may be practiced. Specifically, FIG. 5 depicts the collection and processing of logs 504 generated by computing resources (e.g., virtual machines) provided by a computing resource service provider to customers. The environment 500 may include a stream service 540 that receives one or more logs 504 from computing resources executed by servers in the sets of racks 512A-512B. The computing resources may be placed on the service according to a rack diversity constraint, where the sets of racks 512 may be localized by different networks 526A-26B. The logs 504 may include various logs $504_{k-i}$ obtained from different computing resources executed by the servers in the sets of racks 512A-512B. The stream service 540 may be a computing system of one or more computing systems configured to obtain logs $504_{k-i}$ generated by computing resources of computing resources as described above in conjunction with FIG. 1. Furthermore, the stream service 540 may include computer systems configured to process the logs 504 and generate log data 546 which may be consumed by block-level forensics service 510, for example, as a stream of data.

The sets of racks 512A-512B may be physical hardware configured to host one or more servers, or, in some embodiments, may simply be logical groupings of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The servers in a rack may be members of a particular network. In some implementations, multiple racks of servers may be members of the same network. For example, as illustrated in FIG. 5, the servers of the set of racks 512A share the network 526A. Likewise, the servers of the set of racks 512B share the network 526B. Additionally, the set of racks 512A and 512B may be a "brick server" or other server that is a compact computer server module without a chassis that may include various processors, RAM, I/O, and storage configurations and may be designed to fit into various rack locations. The set of racks 512A and 512B may also be connected by a top of rack switch.

The networks 526A-526B may be data communication pathways between one or more electronic devices. The networks 526A-526B may be wired or wireless networks and may use any of a variety of communications protocols for organizing their network traffic. The networks 526A-526B may allow the sharing of files, data, and other types of information between the one or more electronic devices accessible through the data communication pathways. Each of the networks 526A-526B may be associated with a router, such as an aggregation router that aggregates the servers of the respective set of racks into the common network, separate from the router associated with the other network. Each of the networks 526A-526B may be on a different subnet than the other network. For example, as illustrated in FIG. 5, the servers of the set of racks 512A may be commonly connected to a router 528A. Similarly, the servers of the set of racks 512B may be commonly connected to a router 528B. The routers 528A-528B may be networking devices that forward packets between computer networks, such as between the networks 526A-526B.

The stream service 540 may also include a data warehouse or data storage system that stores the log data 546 and/or logs $504_{k-i}$ such that the logs may be queried. In this manner, the block-level forensics service 510 may be able to query the log data 546 and/or logs $504_{k-i}$ for information as well as being provided information corresponding to the log data 546 and/or logs $504_{k-i}$ through a data stream. In various embodiments, the data stream includes the log data 546 and/or logs $504_{k-i}$. The block-level forensics service 510 may be a computer system managed by a user and/or customer, for example, a customer of a computing resource service provider. Additionally, the block-level forensics service 510 may be another service or computer system of the computing resource service provider. For example, block-level forensics service 510 may be provided access to the logs $504_{k-i}$ by a customer. This may cause the stream service to provide log data 546 to the block-level forensics service 510 for analysis and monitoring. The log data 546 may contain all of the updates to a log-structure storage device implemented by the server computer systems.

Figure 6:
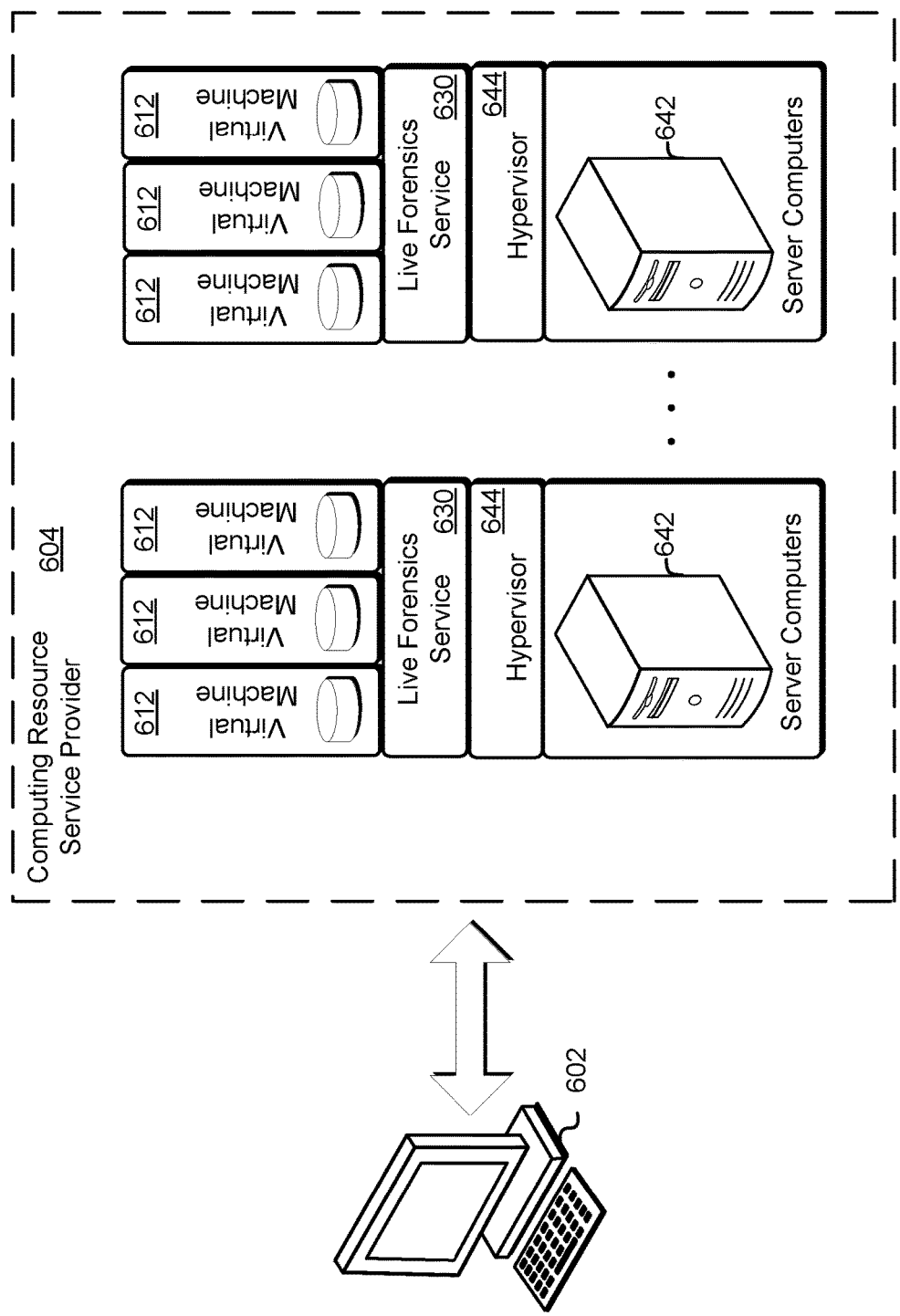
FIG. 6 illustrates an example environment in which a block-level forensics service may analyze a log of a volume in a log-structured storage format volume in accordance with an embodiment.

FIG. 6 illustrates a virtual computer system service executing a plurality of virtual machines 612 including logical volumes managed by a data storage service in accordance with at least one embodiment. The virtual computer system service (not illustrated in FIG. 6 for simplicity), which may be implemented by server computers 642, is used by a computing resource service provider 604 to provide computation resources for customers 602. The customers 602 may include website operators, online retailers, social network providers, cable providers, online game providers, or any entity capable of receiving automated agent traffic. The server computers 642 may include physical hosts also referred to as a host computer system. The physical hosts may be any device or equipment configured to execute instructions for performing data computation, manipulation or storage tasks, such as a computer or a server. A physical host may be equipped with any needed processing capability including one or more processors, such as a central processing unit (CPU), memory management unit (MMU), a graphics processing unit (GPU) or a digital signal processor (DSP), memory, including static and dynamic memory, buses and input and output ports that are compliant with any handshaking, communications or data transfer protocol. The server computers 642 may also include storage devices, such as storage disks and tapes, networking equipment and the like. The storage devices may be executed by network storage devices managed by a data storage service.

A virtualization layer executing on the physical host enables the server computers 642 to be used to provide computational resources upon which one or more virtual machines 612 may operate. For example, the virtualization layer may enable a virtual machine 612 to access server computers 642 on the physical host through virtual device drivers on the virtual machine 612. Furthermore, physical host may host multiple hypervisors of the same or different types on the same server computers 642. The hypervisor 644 may be any device, software, or firmware used for providing a virtual computing platform for the virtual machines 612. The virtual computing platform may include various virtual computer components, such as one or more virtual CPUs, virtual memory management units, virtual memory, and the like. The virtual machines 612 may be provided to the customers 602 of the computing resource service provider 604 and the customers 602 may run an operating system or an application on the virtual machines 612. Further, the computing resource service provider 604 may use one or more of its own virtual machines 612 for executing its applications, such as the live forensics service 630. The hypervisor 644 may expose to the virtual machines 612 a logical volume implemented by the data storage service (not shown in FIG. 6 for simplicity). Furthermore, live forensics service 630 may monitor requests received at the hypervisor 644 to interact with data contained in the logical volumes. For example, the logical volume may utilize a log-structured storage system and the live forensics service 630 monitors log-events and performs forensic analysis of log events to detect malicious activity. This may be performed in-line with committing operations to the log, such that in the event the live forensics service 630 detects malicious activity the operation may be prevented from being committed to the log or other operations to mitigate the malicious activity may be performed, such as notifying the customer 602.

As described above, the virtual machine 612 may be used for various purposes, such as to operate as servers supporting a website, to operate business applications, or, generally, to serve as computing power for the customer 602. Other applications for the virtual machine 612 may be to support database applications, electronic commerce applications, business applications, and/or other applications. The live forensics service 630 may monitor the operation of the virtual machines 612 by at least performing forensics analysis on one or more portions of the logical volumes attached to the virtual machines 612. This may include portions of the logical volume that are interacted with more frequently than the other portions of the logical volume. The live forensics service 630 may then indicate to a block-level forensics service a result of the analysis performed. For example, the live forensics service 630 may determine the most frequently accessed areas of the attached logical volumes or the most common files among the logical volumes attached to a set of virtual machines 612. The most frequently accessed areas of the attached logical volumes may include a file or portion thereof. In this manner the live forensics service 630 may monitor for malicious activity and may operate as an intrusion detection system and/or sensor.

In one embodiment, the live forensics service 630 may generate a copy of operations to the log and perform analysis on the copy or provide the copy to the block-level forensics service. The live forensics service 630 may only copy portions of the logical volume that have been modified since the last analysis of the logical volume was performed. In this way the live forensics service 630 may reduce an amount of data that is copied before analysis may be performed. In yet another embodiment, the live forensic service 630 is granted read access to a point-in-time consistent version of the logical volume while the logical volume is still attached to the virtual machine 612 without the need to copy the data.

Figure 7:
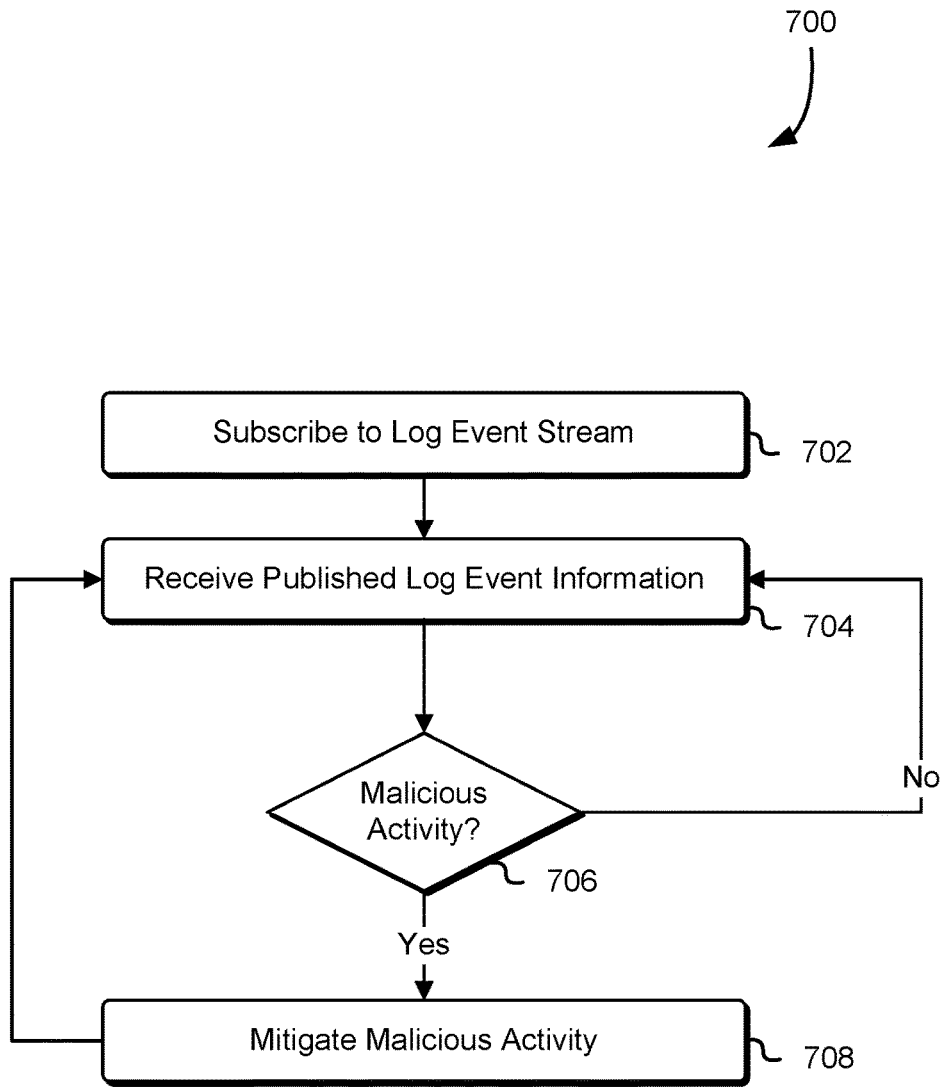
FIG. 7 shows an illustrative process which may be used to analyze a log of a volume in a log-structured storage format volume in accordance with an embodiment.

FIG. 7 is a block diagram illustrating an example of a process 700 for executing forensics analysis and/or monitoring of a volume in accordance with at least one embodiment. The process 700 may be performed by any suitable system such as a block-level forensics service or component thereof as described above in connection with FIGS. 1 and 3. The process 700 includes subscribing to a log event stream 702. The log event stream may include operations of a block-level storage device implementing a log-structured storage system as described above. The log event stream may be provided by a stream service or may be obtained directly from computing resources associated with the block-level storage device. The block-level forensics service may obtain access to the log event stream as a result of a customer requesting monitoring of the block-level storage device. In addition, obtaining access to the log event stream may include obtaining credentials or cryptographic information required to access the log event stream.

The block-level forensics service may then begin to receive published log event information 704. The published log event information may be received from the log event stream and may include all of the events from the stream or particular events the block-level forensics service is subscribed to. For example, the published log event information may include only a subset of all of the operations performed by a virtual machine and/or block-level storage device, such as only write operations to a set of memory ranges or offsets. In yet other embodiments, the published log event information includes all operations and/or events to the log. In addition the published log event information may include additional information determined and/or obtained by the block-level forensics service. For example, the published log event information may include network telemetry or correlated threat information obtained from one or more other services or computing resources provided by the computing resource service provider. In another example, the block-level forensics service determines the additional information based at least in part on the log. Such information may include determining sequential operations, generating a hash of data written to the log and/or block-level storage device, or any other information suitable for detecting malicious activity. Multiple log entries may be combined and/or tracked to determine operations of a file-system supported by the block-level storage device. For example, multiple log operations may be analyzed together to determine that a file and/or folder has been created in a file-system stored on the logical volume.

The block-level forensics service may then detect malicious activity 706 based at least in part on the published log event information. In some embodiments, the block-level forensics service may detect malicious activity based at least in part on a set of rule or heuristics. For example, operating system libraries are recorded in a set of blocks; any attempt to write to the set of blocks is flagged or otherwise marked as malicious activity or potential malicious activity. The block-level forensics service may monitor the published event information for an interval of time and determine the set of rules or heuristics and/or adjust the set of rules or heuristics. Various techniques such as machine learning, operational experience (e.g., human generated rules), statistical methods, or some combination of techniques may be used to generated and/or update the set of rules or heuristics. Furthermore, the log events may be compared and/or correlated with the additional information included in the published log event information such as metadata or contents of the data (e.g., hash of the data written to the log). For example, the data written to the log may be compared to signatures of know malware and if the block-level forensic service detects a match, the block-level forensic service may indicate malicious activity.

If malicious activity is detected the block-level forensic service may attempt to mitigate the malicious activity 708. This may include transmitting a notification and/or alarm to an administrator. In another example, the block-level forensic service may record the detected malicious activity and other information associated with the malicious activity in a log or other data structure. Other mitigation techniques may be used, for example, the block-level forensic service may attempt to prevent performance of the operation corresponding to the detected malicious activity. The block-level forensic service may continue to receive published log event information and monitor the block-level storage device while attempting to mitigate any detected malicious activity. Alternatively, if no malicious activity is detected, the block-level forensic service may continue to receive to receive published log event information and monitor the block-level storage device.

Figure 8:
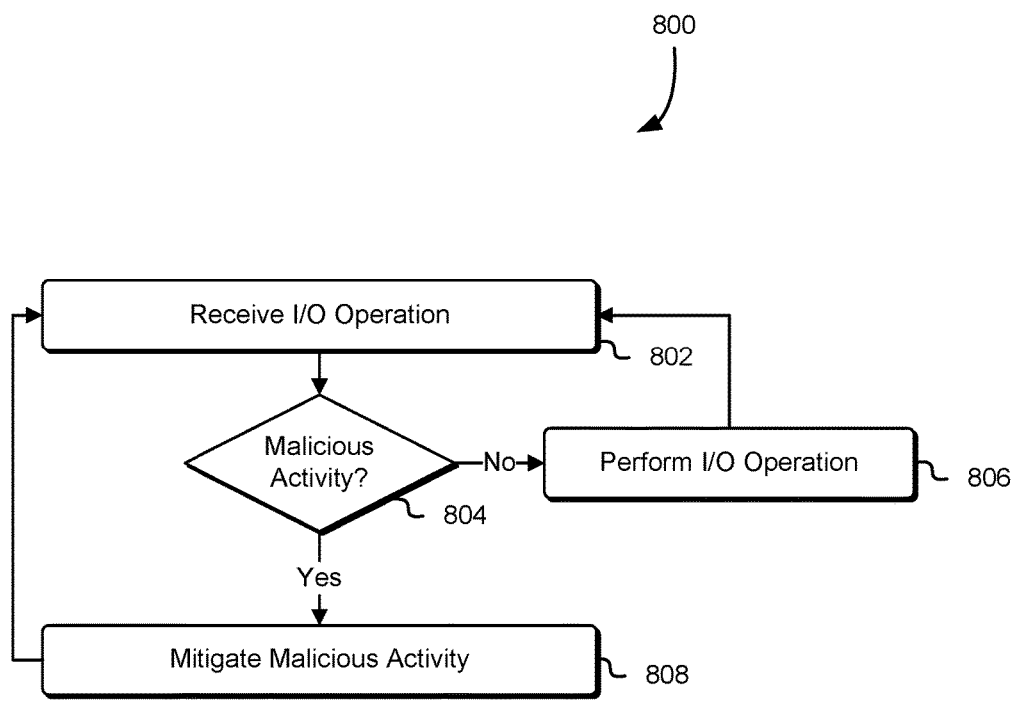
FIG. 8 shows an illustrative process which may be used to analyze operations on a volume in-line with processing of the operations in accordance with an embodiment.

FIG. 8 is a block diagram illustrating an example of a process 800 for executing in-line forensics analysis and/or monitoring of a volume in accordance with at least one embodiment. The process 800 may be performed by any suitable system such as a live forensics service or component thereof as described above in connection with FIG. 6. The process 800 includes receiving an I/O operation 802. The I/O operation may be a commit operation to a block-level storage device implementing a log-structured storage system as described above. For example, the I/O operation may write to a particular offset in the volume included in a new entry to the log corresponding to the block-level storage device. As described above, the block-level storage device may be virtualized and provided to a virtual machine or other computer system. The live forensics service may receive or intercept storage operations directed to the block-level storage device.

The live forensics service may then detect malicious activity 804 based at least in part on the I/O operation. In some embodiments, the live forensics service may detect malicious activity based at least in part on a set of rule or heuristics. For example, operating system libraries are recorded in sets of blocks, any attempt to write to the set of blocks is flagged or otherwise marked as malicious activity or potential malicious activity. The live forensics service may monitor I/O operations to the block-level storage device for an interval of time and determine the set of rules or heuristics and/or adjust the set of rules or heuristics. Various techniques such as machine learning, operational experience (e.g., human generated rules), statistical methods, or some combination of techniques may be used to generated and/or update the set of rules or heuristics. Furthermore, the I/O operations may be compared and/or correlated with the additional information such as metadata or contents of the data (e.g., hash of the data written to the log). For example, the data written to the log may be compared to signatures of know malware and if the live forensic service detects a match, the block-level forensic service may indicate malicious activity. A block-level forensics service may manage a set of live forensics modules executing on server computer system as described above in connection with FIG. 6.

If malicious activity is detected the live forensic service may attempt to mitigate the malicious activity 808. The live forensics service may prevent the block-level storage device from performing the I/O operations. For example, the live forensics service may prevent the I/O operation from being transmitted to the block-level storage device, which may be remote relative to the computer system responsible for generating the I/O operation. Furthermore, the live forensics service may also transmit a notification and/or alarm to an administrator or other entity associated with the computer system responsible for generating the I/O operation. In another example, the live forensic service may record the detected malicious activity and other information associated with the malicious activity in a log or other data structure and allow the I/O operation to be performed by the block-level storage device. If no malicious activity is detected, the live forensics service may cause and/or enable the I/O operation to be performed 806. For example, the live forensics service may transmit the I/O operation to the block-level storage device or may enable a hypervisor to transmit the I/O operation to the block-level storage device.

Figure 9:
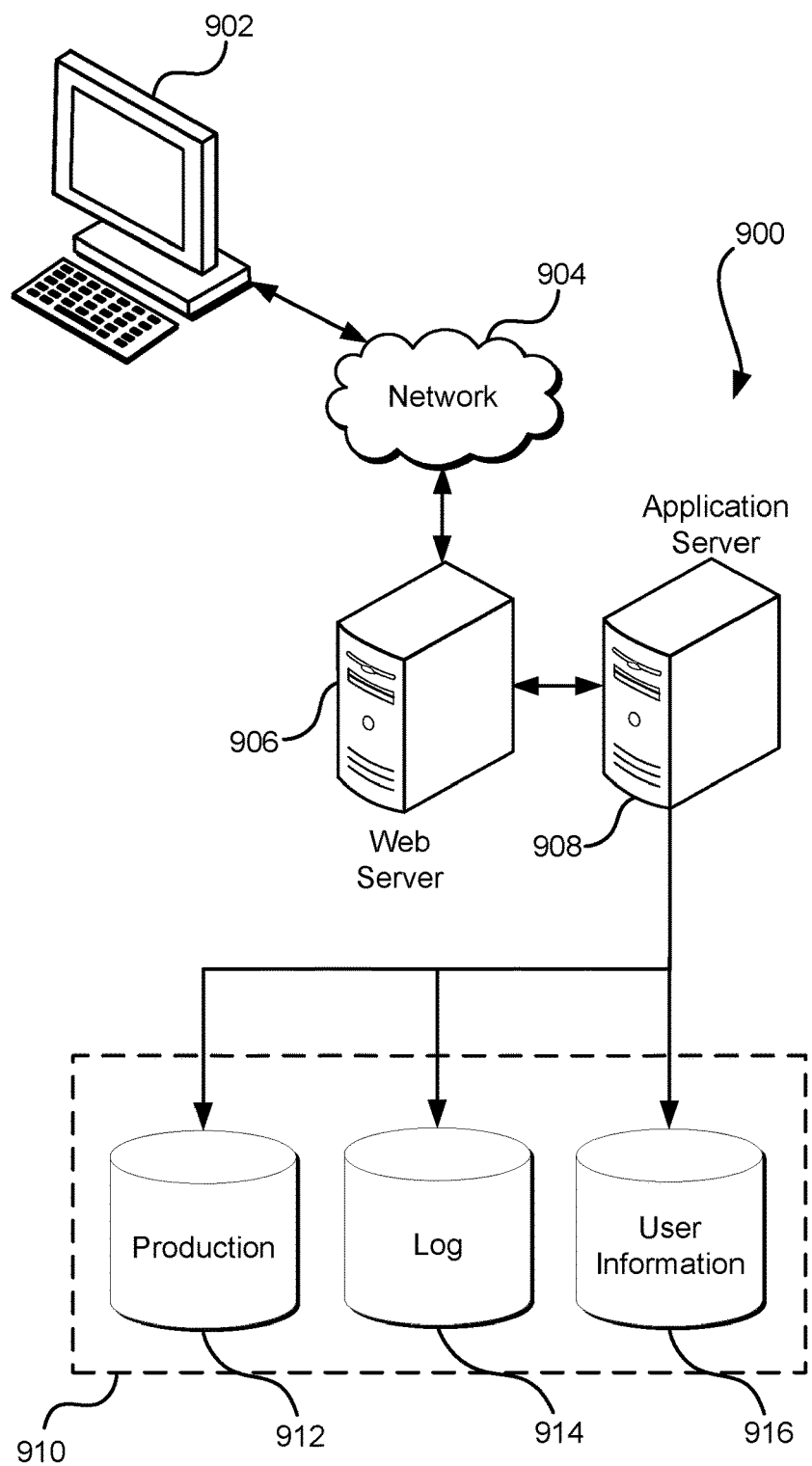
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems configured with executable instructions,
receiving an application programming interface request to monitor a logical volume attached to a virtual machine instance, the logical volume associated with a customer of a computing resource service provider, the computing resource service provider implementing the logical volume as a log-structured storage system on hardware provided by the computing resource service provider;
obtaining access to a stream of log events of the logical volume in response to the application programming interface request, the stream of log events indicating input/output operations of the logical volume; and
for at least a subset of log events included in the stream of log events:
detecting malicious activity on the logical volume based at least in part on the subset of log events; and
performing an operation to mitigate the malicious activity.

2. The computer-implemented method of claim 1, wherein detecting malicious activity on the logical volume further comprises determining if a particular log event of the subset of log events violates a rule set associated with the logical volume.

3. The computer-implemented method of claim 1, wherein detecting malicious activity on the logical volume further comprises detecting data written to the logical volume violates a rule set associated with the logical volume.

4. The computer-implemented method of claim 1, wherein the malicious activity further comprises writing to a location on the logical volume associated with an operating systems of the virtual machine instance.

5. The computer-implemented method of claim 1, wherein performing the operation to mitigate the malicious activity further comprises transmitting a notification of the malicious activity to an administrator associated with the customer.

6. A system, comprising:
one or more processors; and
memory that includes instructions that, as a result of execution by the one or more processors, cause the system to:
monitor a logical volume associated with a customer of a computing resource service provider by at least:
obtaining access to a log of operations to the logical volume, the log of operations generated as a result of the logical volume being implemented as log-structure storage;
detecting malicious activity based at least in part on a portion of the log of operations; and
mitigating the malicious activity.

7. The system of claim 6, wherein the memory further comprises instructions that, as a result of execution by the one or more processors, cause the system to perform analysis of the logical volume prior to monitoring the logical volume.

8. The system of claim 6, wherein monitoring the logical volume further comprises correlating the malicious activity with additional threat information obtained from at least one other system.

9. The system of claim 8, wherein additional threat information further comprises network telemetry information obtained from an intrusion detection system.

10. The system of claim 8, wherein additional threat information further comprises a signature of a malware application.

11. The system of claim 10, wherein monitoring the logical volume further comprises:
    determining a set of sequential operations based at least in part on a portion of the log of operations; and
    detecting malicious activity based at least in part on the set of sequential operations.

12. The system of claim 6, wherein the logical volume is implemented as log-structured storage.

13. The system of claim 12, wherein monitoring the logical volume is performed prior to execution of an operation on the logical volume; and
    wherein mitigating the malicious activity further comprises preventing the operation from being committed to the logical volume.

14. A non-transitory computer-readable storage medium having stored thereon executable instructions that, as a result of being executed by one or more processors of a computer system, cause the computer system to at least:
    receive a request to monitor a logical volume attached to a virtual machine, the logical volume used to instantiate the virtual machine utilizing computing resources of a computing resource service provider and the logical volume implemented as log-structured storage, where the computing resources are distributed across one or more service provider networks operated by the computing resource service provider;
    obtain access to a set of operations performed on the logical volume;
    detect malicious activity based at least in part on a portion of the set of operations; and
    mitigate the malicious activity.

15. The non-transitory computer-readable storage medium of claim 14, wherein the instructions that cause the computer system to obtain access to the set of operations further include instructions that cause the computer system to obtain a set of entries appended to a log corresponding to the logical volume.

16. The non-transitory computer-readable storage medium of claim 14, wherein the instructions that cause the computer system to detect malicious activity further include instructions that cause the computer system to determine that a particular operation of the set of operations is associated with malicious activity based at least in part on a set of rule defining malicious activity associated with the logical volume.

17. The non-transitory computer-readable storage medium of claim 14, wherein the instructions further comprise instructions that, as a result of being executed by the one or more processors, cause the computer system to:
    obtain additional threat information from at least one other computer system; and
    wherein detecting malicious activity further comprises detecting malicious activity based at least in part on the portion of the set of operations and the additional threat information.

18. The non-transitory computer-readable storage medium of claim 17, wherein the instructions further comprise instructions that, as a result of being executed by the one or more processors, cause the computer system to update a set of rules used to detect malicious activity based at least in part on the additional threat information.

19. The non-transitory computer-readable storage medium of claim 14, wherein the instructions further comprise instructions that, as a result of being executed by the one or more processors, cause the computer system to:
    monitor the set of operations for an interval of time to generate monitoring information; and
    generate a set of rules for detecting malicious activity based at least in part on the monitoring information.

20. The non-transitory computer-readable storage medium of claim 14, wherein the instructions further comprise instructions that, as a result of being executed by the one or more processors, cause the computer system to correlate the malicious activity with additional threat information obtained from at least one other computer system.

* * * * *